United States Patent
Lin

(10) Patent No.: US 10,691,328 B2
(45) Date of Patent: Jun. 23, 2020

(54) METHOD AND APPARATUS FOR SWITCHING THE DISPLAY STATE BETWEEN MESSAGING RECORDS AND CONTACTS INFORMATION

(71) Applicant: TENCENT TECHNOLOGY (SHENZHEN) COMPANY LIMITED, Shenzhen (CN)

(72) Inventor: Baike Lin, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 264 days.

(21) Appl. No.: 15/356,864

(22) Filed: Nov. 21, 2016

(65) Prior Publication Data

US 2017/0068443 A1    Mar. 9, 2017

Related U.S. Application Data

(63) Continuation of application No. PCT/CN2015/079554, filed on May 22, 2015.

(30) Foreign Application Priority Data

May 22, 2014    (CN) .......................... 2014 1 0218814

(51) Int. Cl.
G06F 3/0488    (2013.01)
G06F 3/0482    (2013.01)

(52) U.S. Cl.
CPC ........ G06F 3/04883 (2013.01); G06F 3/0482 (2013.01)

(58) Field of Classification Search
CPC .......................... G06F 3/0482; G06F 3/04883
See application file for complete search history.

(56) References Cited

U.S. PATENT DOCUMENTS

2009/0005011 A1* 1/2009 Christie ............... G06Q 10/107
                                                            455/412.2
2010/0060788 A1    3/2010 Blackburn et al.
(Continued)

FOREIGN PATENT DOCUMENTS

CN            1996282 A   *   7/2007
CN          101179524 A       5/2008
(Continued)

OTHER PUBLICATIONS

Search Report in International Application No. PCT/CN2015/079554 dated Jul. 28, 2015, 2 pages.
(Continued)

*Primary Examiner* — Jennifer N To
*Assistant Examiner* — Reji Kartholy
(74) *Attorney, Agent, or Firm* — Brinks Gilson & Lione

(57) ABSTRACT

The present disclosure discloses an information display method and apparatus, and belongs to the field of computer technologies. The information display method includes: displaying a list interface; receiving a trigger signal for changing a display state of the list interface; extracting contact information from each piece of information in the list interface; and displaying the extracted contact information in an aggregated state. A problem of low information search efficiency in the existing technology is solved, and an effect of improving the information search efficiency is achieved.

17 Claims, 9 Drawing Sheets

(56) References Cited

U.S. PATENT DOCUMENTS

| | | | | |
|---|---|---|---|---|
| 2010/0283743 | A1* | 11/2010 | Coddington | G06F 3/0485 345/173 |
| 2012/0210253 | A1* | 8/2012 | Luna | G06Q 10/107 715/753 |
| 2013/0014021 | A1* | 1/2013 | Bau | G06Q 10/107 715/739 |
| 2015/0026592 | A1* | 1/2015 | Mohammed | G06F 3/04847 715/752 |
| 2015/0277685 | A1* | 10/2015 | Shieh | G06F 3/0412 715/752 |

FOREIGN PATENT DOCUMENTS

| | | |
|---|---|---|
| CN | 101198110 A | 6/2008 |
| CN | 101515270 A | 8/2009 |
| CN | 103200549 A | 7/2013 |

OTHER PUBLICATIONS

International Preliminary Report on Patentability and Written Opinion in International Application No. PCT/CN2015/079554 dated Nov. 22, 2016, 4 pages.

* cited by examiner

METHOD AND APPARATUS FOR SWITCHING THE DISPLAY STATE BETWEEN MESSAGING RECORDS AND CONTACTS INFORMATION

This application is a continuation of Application No. PCT/CN2015/079554, filed on May 22, 2015. This application claims the benefit and priority to of Chinese Patent Application No. 201410218814.2, entitled "information display method and apparatus" and filed on May 22, 2014. The entire disclosures of each of the above applications contents of all of which are incorporated herein by reference in their entirety for all purposes.

FIELD OF THE TECHNOLOGY

The present disclosure relates to the field of computer technologies, and in particular, to an information display method and apparatus.

BACKGROUND OF THE DISCLOSURE

At present, information such as short message service messages, e-mails, and instant messaging records is generally displayed on a terminal in a form of a list. Each piece of information in the list generally includes contact information of a communication peer end and communication content and communication time of the last communication with the communication peer end.

For example, instant messaging records are displayed in a form of a list. After a user communicates with a friend 'Huahua' for the first time by using an instant messaging tool, a terminal adds, to the list, a new communication record corresponding to 'Huahua'.

In the process of implementing the present disclosure, the inventor finds that the existing technology has at least the following problems: When a user needs to search a list for a record of communication with a friend, the user needs to continuously slide the list, to find required information after sliding multiple times, thereby having a low information search efficiency. Particularly, as the number of friends communicating with the user increases, the list gets increasingly long, and accordingly the information search efficiency becomes lower. In addition, because the user needs to continuously slide the list on a terminal, the service life of the touch screen and battery of the terminal is shortened imperceptibly.

SUMMARY

To solve problems in the existing technology that information search efficiency is low and the service life of a touch screen and battery of a terminal is shortened, embodiments of the present invention provide an information display method and apparatus. Technical solutions are as follows:

According to a first aspect, an information display method is provided, including:

displaying a list interface;

receiving a trigger signal for changing a display state of the list interface;

extracting contact information from each piece of information in the list interface; and displaying the extracted contact information in an aggregated state.

According to a second aspect, an information display apparatus is provided, including:

a first interface display module, configured to display a list interface;

a trigger signal receiving module, configured to receive a trigger signal for changing a display state of the list interface;

an information extracting module, configured to extract contact information from each piece of information in the list interface displayed by the interface display module; and a contact information display module, configured to display, in an aggregated state, the contact information extracted by the information extracting module.

The technical solutions of the present disclosure bring the following beneficial effects:

When a list interface is displayed, a trigger signal for changing a display state of the list interface is received, contact information is extracted from each piece of information in the list interface, and then the extracted contact information is displayed in an aggregated state, so that the number of pieces of contact information that can be displayed in a terminal interface is greater than the number of pieces of contact information that can be displayed in the list interface, and a user can conveniently search the terminal interface for required contact information, and further find required information. A problem of low information search efficiency in the existing technology is solved, and an effect of improving the information search efficiency is achieved; in addition, because the number of pieces of contact information that can be displayed in the terminal interface is greater than the number of pieces of contact information that can be displayed in the list interface, during information search, the user can find required information by sliding a fewer number of times or even without performing a slide operation, solving a problem in the existing technology that the service life of a touch screen and battery of a terminal is shortened.

BRIEF DESCRIPTION OF THE DRAWINGS

To illustrate the technical solutions in the embodiments of the present invention more clearly, the accompanying drawings for describing the embodiments are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

To make the objectives, technical solutions, and advantages of the present disclosure clearer, the following further describes the present disclosure in detail with reference to the accompanying drawings. Apparently, the described embodiments are merely some rather than all of the embodiments of the present invention. All other embodiments obtained by a person of ordinary skill in the art based on the embodiments of the present invention without creative efforts shall fall within the protection scope of the present disclosure.

Figure 1:
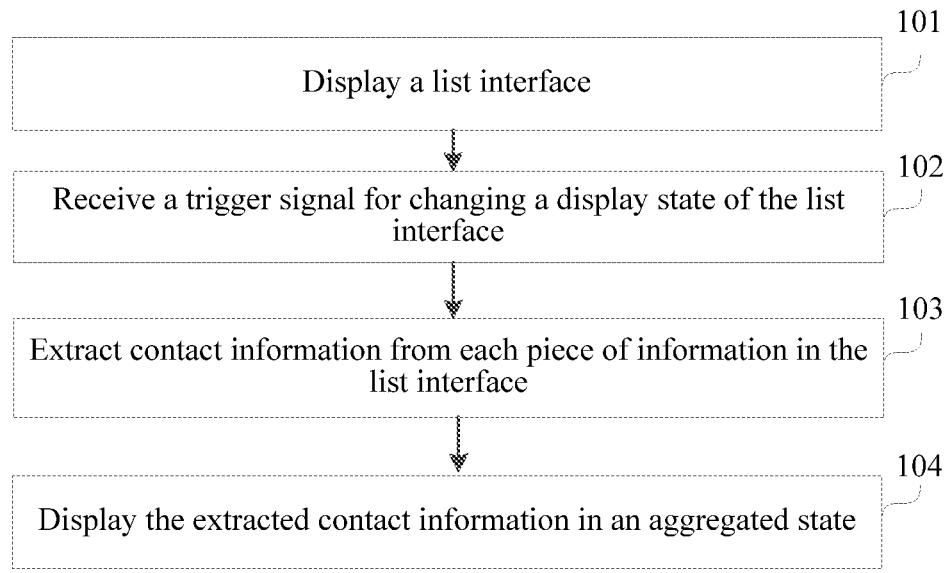
FIG. 1 is a method flowchart of an information display method according to an embodiment of the present invention.

FIG. 1 shows a method flowchart of an information display method according to an embodiment of the present invention. The information display method may include:

Step 101: Display a list interface.

The list interface refers to an interface including multiple pieces of list information, where each piece of list information includes contact information of a communication peer end and communication content and communication time of the last communication with the communication peer end.

Step 102: Receive a trigger signal for changing a display state of the list interface.

Step 103: Extract contact information from each piece of information in the list interface.

Step 104: Display the extracted contact information in an aggregated state.

The aggregated state is a state in which the extracted contact information is displayed closely. During actual implementation, the aggregated state may include an array display state, which is not limited in this embodiment.

To sum up, in the information display method provided in this embodiment, when a list interface is displayed, a trigger signal for changing a display state of the list interface is received, contact information is extracted from each piece of information in the list interface, and then the extracted contact information is displayed in an aggregated state, so that the number of pieces of contact information that can be displayed in a terminal interface is greater than the number of pieces of contact information that can be displayed in the list interface, and a user can conveniently search the terminal interface for required contact information, and further find required information. A problem of low information search efficiency in the existing technology is solved, and an effect of improving the information search efficiency is achieved; in addition, because the number of pieces of contact information that can be displayed in the terminal interface is greater than the number of pieces of contact information that can be displayed in the list interface, during information search, the user can find required information by sliding a fewer number of times or even without performing a slide operation, solving a problem in the existing technology that the service life of a touch screen and battery of a terminal is shortened.

Figure 2A:
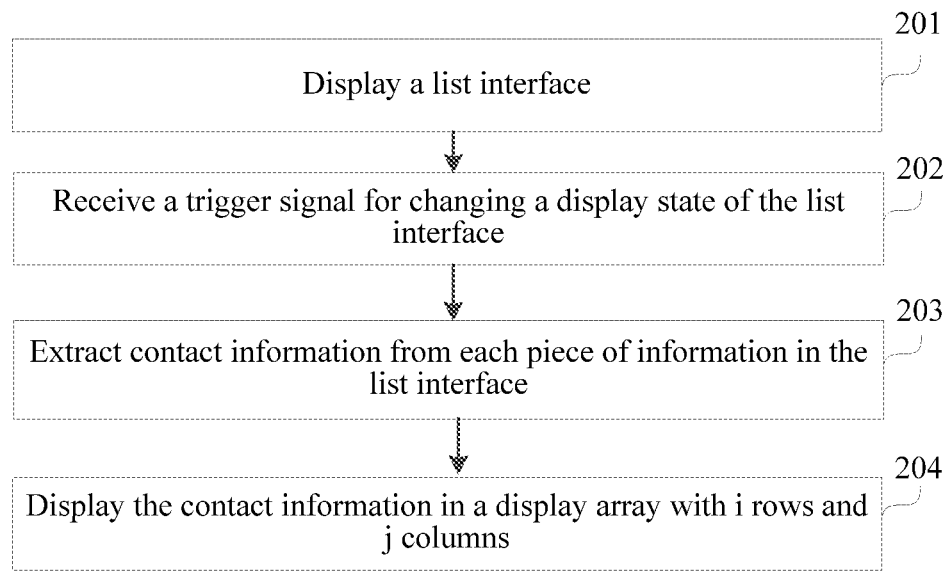
FIG. 2A is a method flowchart of an information display method according to another embodiment of the present invention.

FIG. 2A shows a method flowchart of an information display method according to another embodiment of the present invention. The information display method may include:

Step 201: Display a list interface.

When a user uses a terminal, the user can control the terminal to display the list interface.

The list interface refers to an interface including multiple pieces of list information, where each piece of list information includes contact information of a communication peer end and communication content and communication time of the last communication with the communication peer end.

For example, the list interface is an interface including a historically received e-mail, an interface including a historically received short message service message, or an interface including information about communication with communication peer ends in historical sessions, which is not limited in this embodiment. Description is provided by using an example in which the list interface is an interface including information about communication with communication peer ends in historical sessions. The list interface displayed by the terminal may be an interface shown in FIG. 2B.

Step 202: Receive a trigger signal for changing a display state of the list interface.

When the user intends to display contact information in information in the list interface in an aggregated manner, the user may issue a trigger signal for changing a display state of the list interface. Correspondingly, the terminal can receive the trigger signal for changing the display state of the list interface.

A receiving manner for the terminal to receive a trigger signal for changing a display state of the list interface may include any one of the following manners:

1: Receive a pinching operation of user fingers.

Figure 2B:
FIG. 2B is a schematic diagram of display of a list interface displayed by a terminal in an information display method according to another embodiment of the present invention.

The user may perform a pinching operation by using two fingers in the list interface shown in FIG. 2B on a terminal screen. Correspondingly, the terminal can receive the pinching operation, and use the received pinching operation as a trigger signal.

2: Receive a selection signal for a predetermined option in selection and setting options.

The user may also change the display state of the list interface by using the predetermined option in the selection and setting options. The terminal uses the received selection signal that the predetermined option is selected, as a trigger signal.

During actual implementation, the user may also issue a trigger signal in another manner, that is, the terminal may also receive a trigger signal in another form. This embodiment is merely described by using the foregoing two trigger signals as examples, and does not limit an actual receiving method thereof.

Step 203: Extract contact information from each piece of information in the list interface.

After the terminal receives the trigger signal, the terminal may extract contact information from each piece of information in the list interface. The contact information includes a contact name, a contact avatar, or a combination of the two, which is not limited in this embodiment, and this embodiment uses an example in which the contact information includes both of the two.

For example, for the first piece of information in the list interface shown in FIG. 2B, contact information extracted by the terminal may include 'Sister' and an avatar of the sister.

Step 204: Display the contact information in a display array with i rows and j columns.

The terminal may display the extracted contact information in a display array with i rows and j columns, where i and j are both integers, and j is greater than or equal to 2.

During actual implementation, to display, at a front position in the interface, contact information the user is likely to search for, a display method for the terminal to display the extracted contact information in a display array with i rows and j columns may include:

First: Arrange the contact information in a predetermine order.

The terminal arranges the extracted contact information in a predetermine order. The predetermine order includes at least one of the following orders:

(1) An order of frequencies of interaction with a current terminal by communication peer ends corresponding to the contact information.

An interaction frequency may be a communication frequency when the current terminal communicates with a communication peer end, a frequency of mutual commenting on a social application sharing platform, or a combination of the two, which is not limited in this embodiment. For example, in instant messaging tools, the interaction frequency may be a frequency of historical sessions between the current terminal and the communication peer end and a frequency of commenting a state of each other by the current terminal and the communication peer end on a social application sharing platform 'social network'.

(2) An order of communication time of the last communication with the current terminal by the communication peer ends corresponding to the contact information.

(3) An order of priority levels of groups in which the communication peer ends corresponding to the contact information are located.

In some applications, the user can group friends. For example, the friends are divided into family, relative, schoolmate, colleague, and net friend, and a degree of interest of the user in a friend in each group is different, for example, a degree of interest of the user in family is far higher than those of the other groups. Therefore, for implementation of subsequent steps, after the terminal extracts the contact information from the information, the terminal may arrange the contact information in an order of priority levels of groups in which the communication peer ends corresponding to the contact information is located. For example, the communication peer ends are arranged in an order family>relative>schoolmate>colleague>net friend.

It should be noted that, in some applications, the user may further set a special interest, and a degree of interest of the user in a friend in the special interest is high. Therefore, in this case, the terminal may set a priority level of contact information of the friend in the special interest to be the highest, which is not limited in this embodiment.

It should be further noted that, during actual implementation, the predetermined order may be another order, and this embodiment merely uses an example in which the predetermine order is the foregoing order, and does not limit a specific order.

Second: Display the arranged contact information in the display array with i rows and j columns.

Figure 2C:
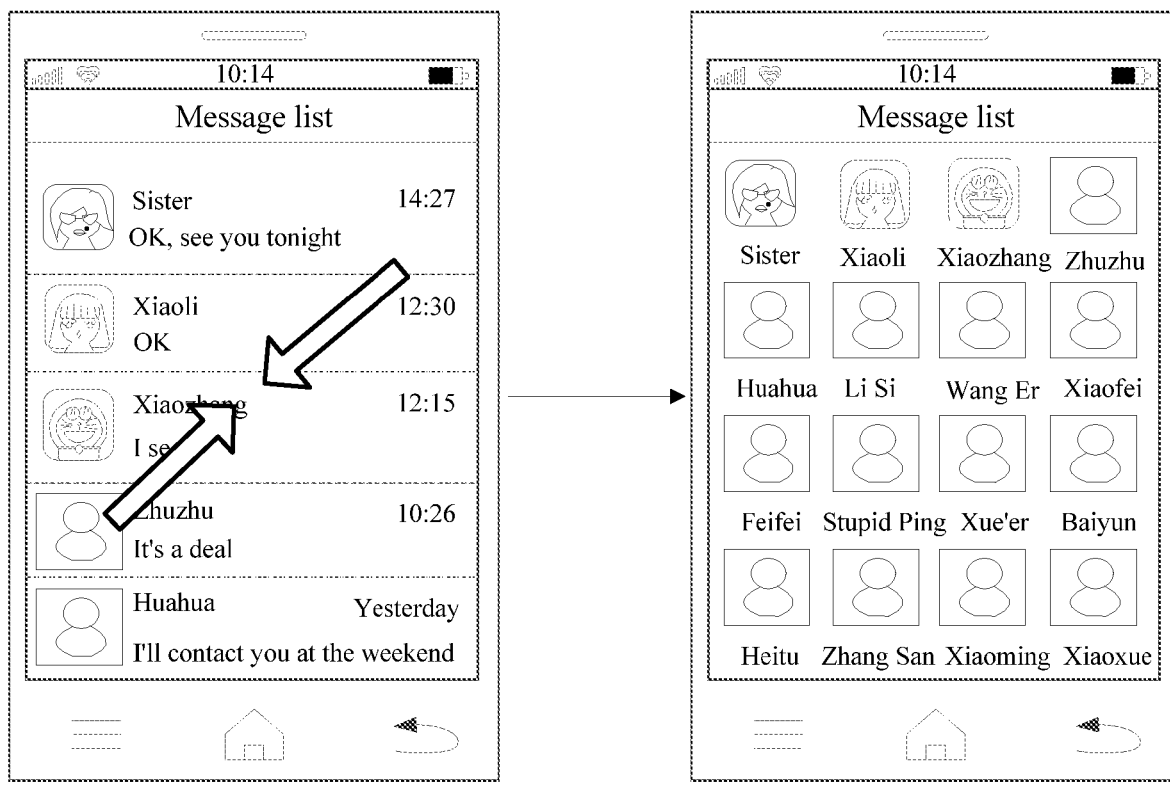
FIG. 2C is a schematic diagram of change of a display interface of a terminal when a user changes a display state by pinching of fingers in an information display method according to another embodiment of the present invention.
Figure 2D:
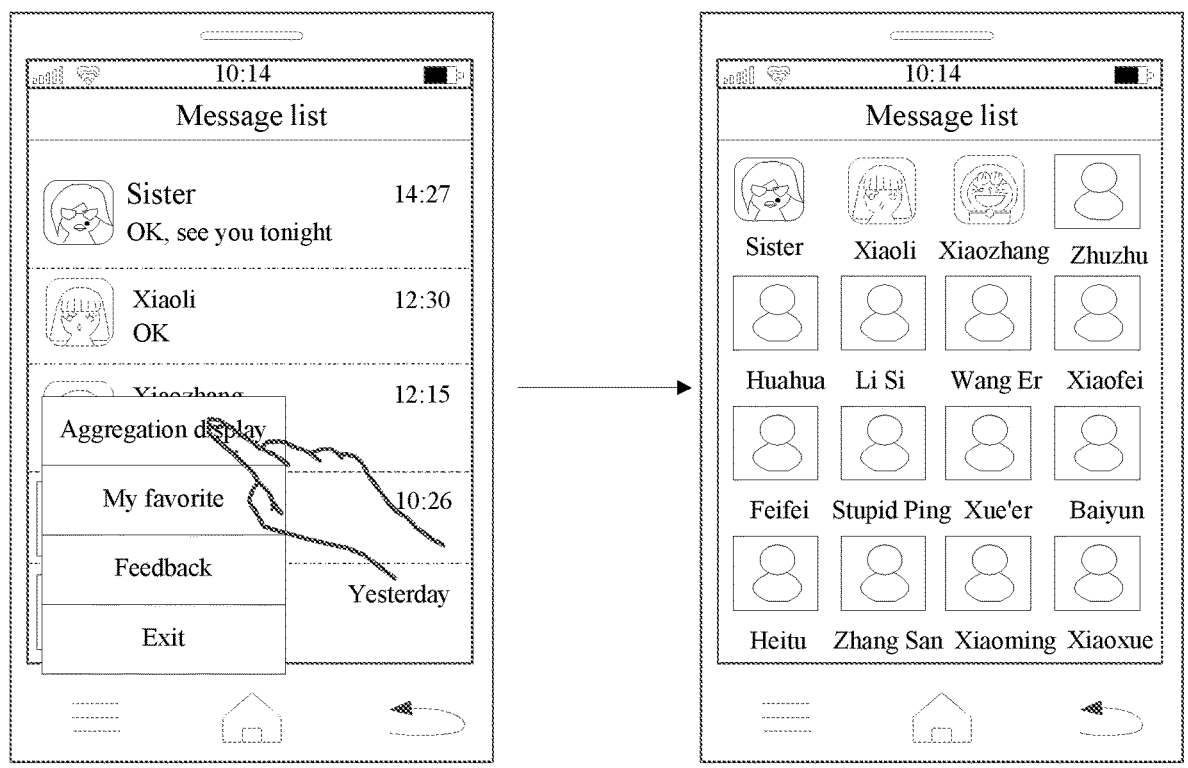
FIG. 2D is a schematic diagram of change of a display interface of a terminal when a user changes a display state by setting an option in an information display method according to another embodiment of the present invention.

After the terminal arranges the contact information, the terminal may display the arranged contact information in the display array with i rows and j columns. For example, referring to FIG. 2C, after receiving the pinching operation of the fingers, the terminal may display the arranged contact information shown in the figure; or referring to FIG. 2D, after receiving the selection signal for the predetermined option in the selection and setting options, the terminal displays arranged the contact information shown in the figure.

During actual implementation, the terminal may display the arranged contact information in the first row, second row, . . . , and $i^{th}$ row in sequence; or display the arranged contact information in the first column, second column, . . . , and $j^{th}$ column in sequence, which is not limited in this embodiment.

Figure 2E:
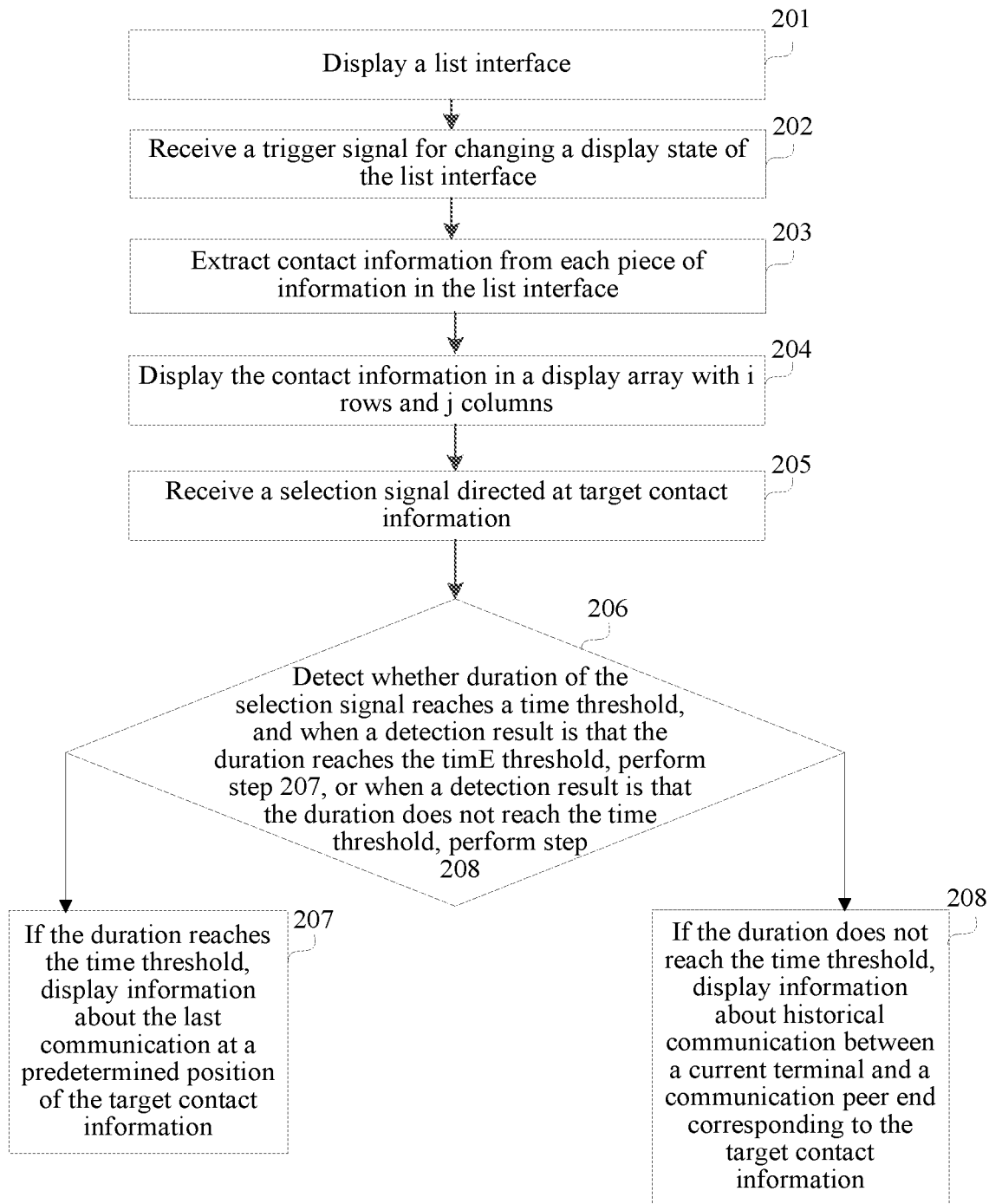
FIG. 2E is another method flowchart of an information display method according to another embodiment of the present invention.

It should be noted that, after the terminal displays the contact information in the display array with i rows and j columns, when the user needs to search for communication information corresponding to a piece of contact information, the user may select target contact information from the displayed contact information. Correspondingly, referring to FIG. 2E, the terminal may perform the following steps:

Step 205: Receive a selection signal directed at target contact information.

When the user intends to view information about communication with a communication peer end corresponding to a piece of contact information, the user may select the contact information from the various contact information displayed by the terminal. Correspondingly, the terminal can receive the selection signal directed at the target contact information.

Step 206: Detect whether duration of the selection signal reaches a time threshold, and when a detection result is that the duration reaches the time threshold, perform step 207, or when a detection result is that the duration does not reach the time threshold, perform step 208.

After the terminal receives the selection signal, the terminal may detect whether duration of the selection signal reaches a time threshold, for example, 3s; and if the duration reaches the time threshold, perform step 207; or if the duration does not reach the time threshold, perform step 208.

Step 207: If the duration reaches the time threshold, display information about the last communication at a predetermined position of the target contact information.

Figure 2F:
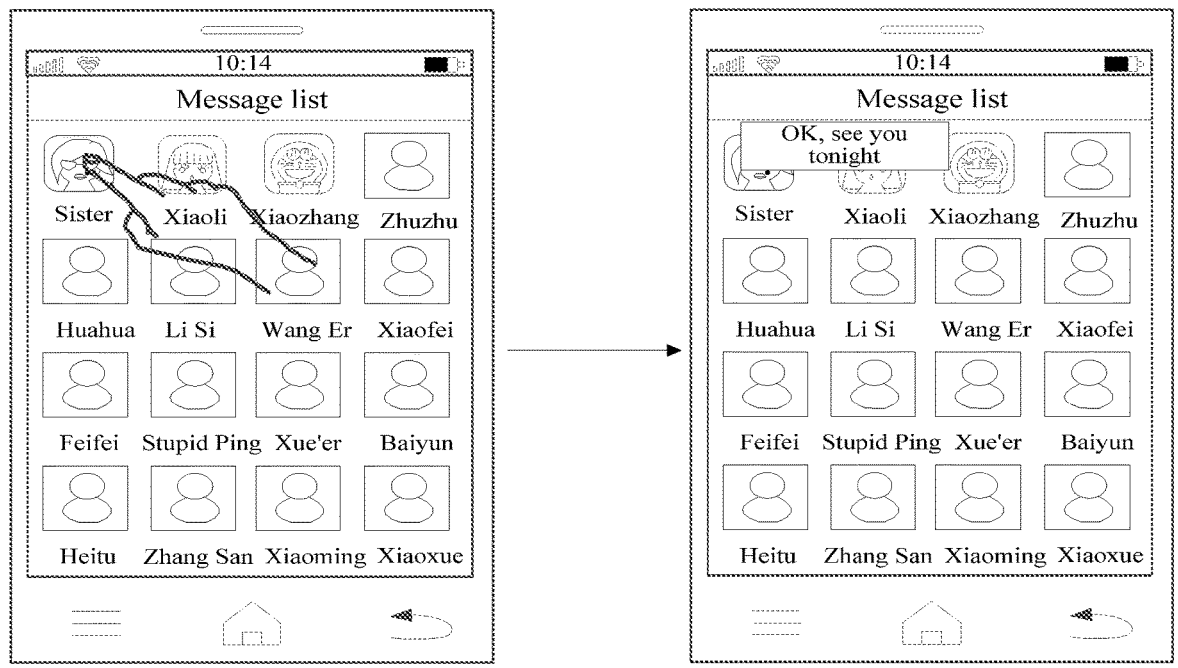
FIG. 2F is a schematic diagram of change of a display interface of a terminal when a user touches and holds target contact information in an information display method according to another embodiment of the present invention.

If the detection result of the terminal is that the duration reaches the time threshold, it indicates that the user touches and holds the target contact information. In this case, the terminal may display information about the last communication at a predetermined position of the target contact information. The predetermined position includes any one of above, below, left, right, upper left corner, upper right corner, lower left corner, and lower right corner; and the information about the last communication is communication information during the last communication between the current terminal and a communication peer end corresponding to the target contact information. For example, if the predetermined position is the upper right corner, referring to FIG. 2F, when the user touches and holds an avatar of 'Sister' or the name "Sister", the terminal may display the information about the last communication at the upper right corner of the contact information.

Step 208: If the duration does not reach the time threshold, display information about historical communication between a current terminal and a communication peer end corresponding to the target contact information.

Figure 2G:
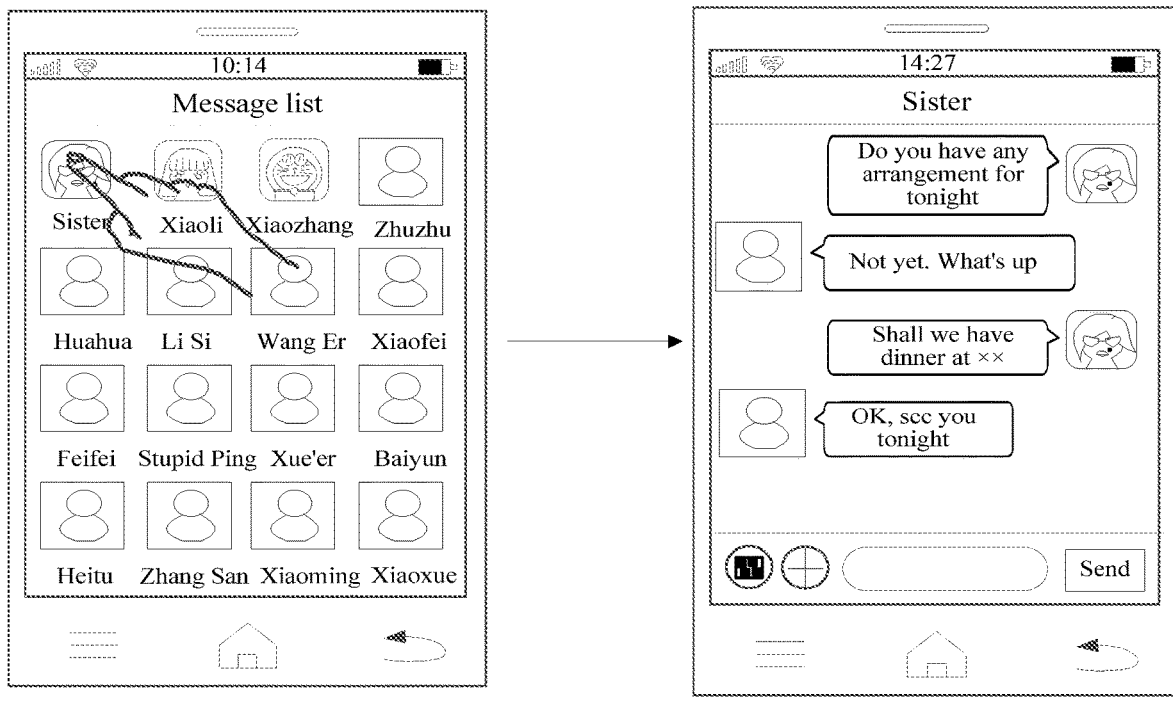
FIG. 2G is a schematic diagram of change of a display interface of a terminal after a user taps target contact information in an information display method according to another embodiment of the present invention.

If the detection result of the terminal is that the duration does not reach the time threshold, it indicates that the selection signal is a tap signal directed at the target contact information. In this case, the terminal may display the information about historical communication between the current terminal and a communication peer end corresponding to the target contact information. For example, referring to FIG. 2G, when the user taps an avatar of 'Sister' or the name 'Sister', the terminal may display information about historical communication with "Sister".

Figure 2H:
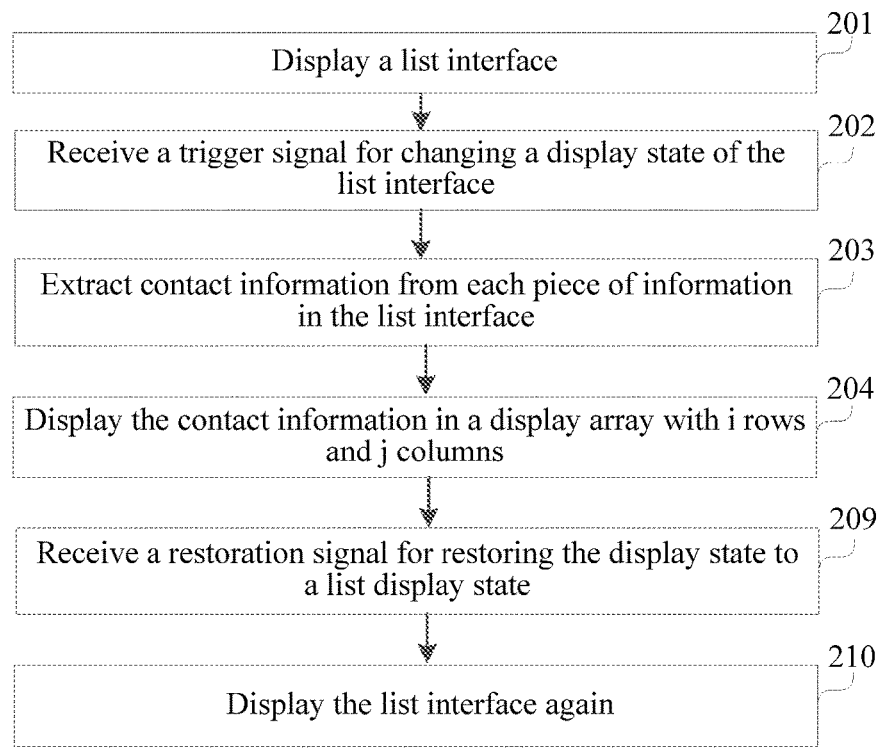
FIG. 2H is still another method flowchart of an information display method according to another embodiment of the present invention.

It should be further noted that, after the terminal displays the contact information in the display array with i rows and j columns, when the user intends to restore to list display, the user may request to restore the display state to a list display state. Correspondingly, referring to FIG. 2H, the terminal may further perform the following steps:

Step 209: Receive a restoration signal for restoring the display state to a list display state.

Corresponding to the receiving manner for the terminal to receive a trigger signal, a receiving manner for the terminal to receive a restoration signal for restoring the display state to a list display state may include:

1: Receive a stretching operation of user fingers.

The user may perform a stretching operation by using two fingers in the aggregation display interface on the terminal screen. Correspondingly, the terminal can receive the stretching operation, and use the received stretching operation as a restoration signal.

2: Receive a selection signal for a restoration option in the selection and setting options.

The user may restore display of the display interface of the terminal by using the restoration option in the selection and setting options. Correspondingly, the terminal can receive the selection signal issued by the user and directed at the restoration option in the selection and setting options. Details are not further described herein in this embodiment.

Step 210: Display the list interface again.

Figure 2I:
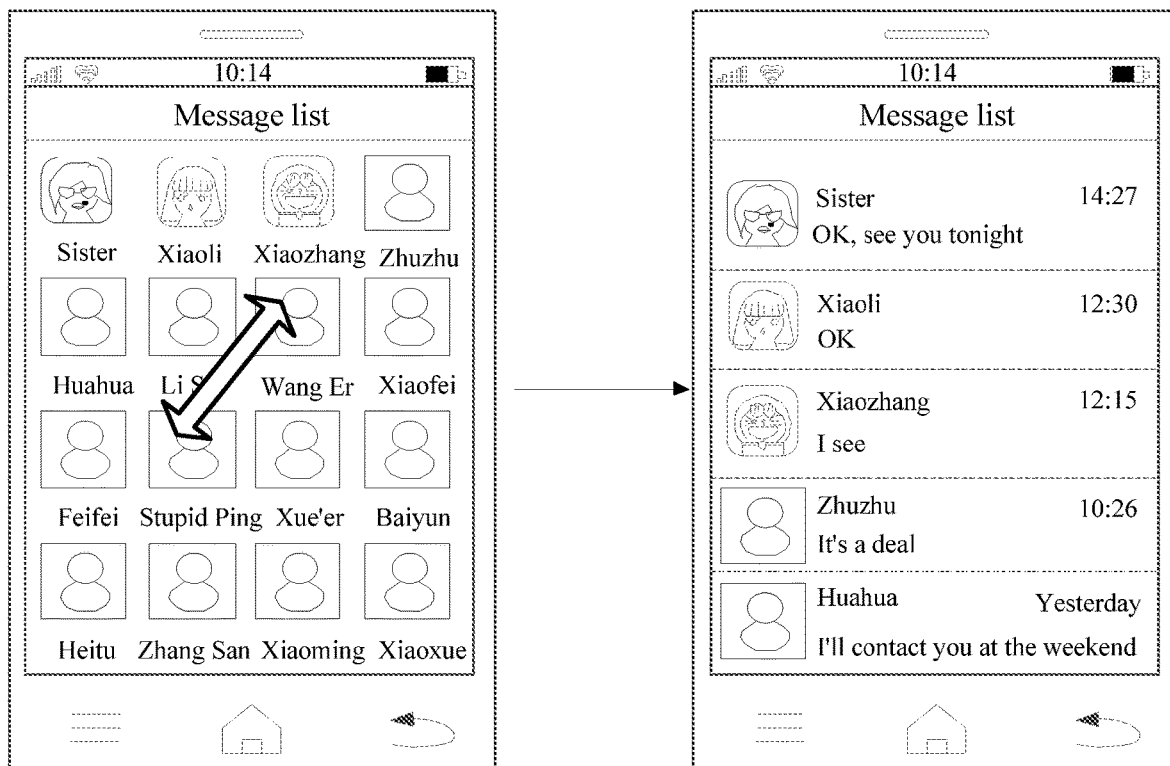
FIG. 2I is a schematic diagram of change of a display interface of a terminal when a user restores a display state by performing a stretching operation by using fingers in an information display method according to another embodiment of the present invention.

After the terminal receives the restoration signal, the terminal may display the list interface again. For example, referring to FIG. 2I, the terminal restores to display the list interface after receiving the stretching operation of the fingers.

To sum up, in the information display method provided in this embodiment, when a list interface is displayed, a trigger signal for changing a display state of the list interface is received, contact information is extracted from each piece of information in the list interface, and then the extracted contact information is displayed in an aggregated state, so that the number of pieces of contact information that can be displayed in a terminal interface is greater than the number of pieces of contact information that can be displayed in the list interface, and a user can conveniently search the terminal interface for required contact information, and further find required information. A problem of low information search efficiency in the existing technology is solved, and an effect of improving the information search efficiency is achieved; in addition, because the number of pieces of contact information that can be displayed in the terminal interface is greater than the number of pieces of contact information that can be displayed in the list interface, during information search, the user can find required information by sliding a fewer number of times or even without performing a slide operation, solving a problem in the existing technology that the service life of a touch screen and battery of a terminal is shortened.

In this embodiment, when the extracted contact information is displayed, the extracted contact information is arranged in a predetermine order, and then the arranged contact information is displayed, so that contact information the user is likely to search for is displayed at a front position in the interface, and when the user performs search, the user can find required contact information in the interface without performing a slide operation, which greatly improves the information search efficiency.

Figure 3:
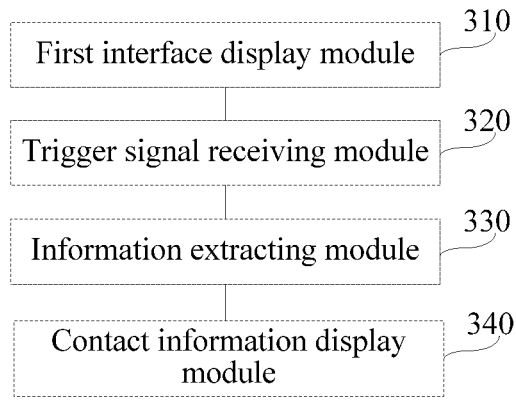
FIG. 3 is a structural block diagram of an information display apparatus according to an embodiment of the present invention.

FIG. 3 shows a structural block diagram of an information display apparatus according to an embodiment of the present invention. The information display apparatus may be implemented by using software, hardware, or a combination of the two, to become all or a part of a terminal. The information display apparatus may include: a first interface display module 310, a trigger signal receiving module 320, an information extracting module 330, and a contact information display module 340, where the first interface display module 310 is configured to display a list interface;

the trigger signal receiving module 320 is configured to receive a trigger signal for changing a display state of the list interface;

the information extracting module 330 is configured to extract contact information from each piece of information in the list interface displayed by the interface display module 310; and the contact information display module 340 is configured to display, in an aggregated state, the contact information extracted by the information extracting module 330.

To sum up, with the information display apparatus provided in this embodiment, when a list interface is displayed, a trigger signal for changing a display state of the list interface is received, contact information is extracted from each piece of information in the list interface, and then the extracted contact information is displayed in an aggregated state, so that the number of pieces of contact information that can be displayed in a terminal interface is greater than the number of pieces of contact information that can be displayed in the list interface, and a user can conveniently search the terminal interface for required contact information, and further find required information. A problem of low information search efficiency in the existing technology is solved, and an effect of improving the information search efficiency is achieved; in addition, because the number of pieces of contact information that can be displayed in the terminal interface is greater than the number of pieces of contact information that can be displayed in the list interface, during information search, the user can find required information by sliding a fewer number of times or even without performing a slide operation, solving a problem in the existing technology that the service life of a touch screen and battery of a terminal is shortened.

Figure 4A:
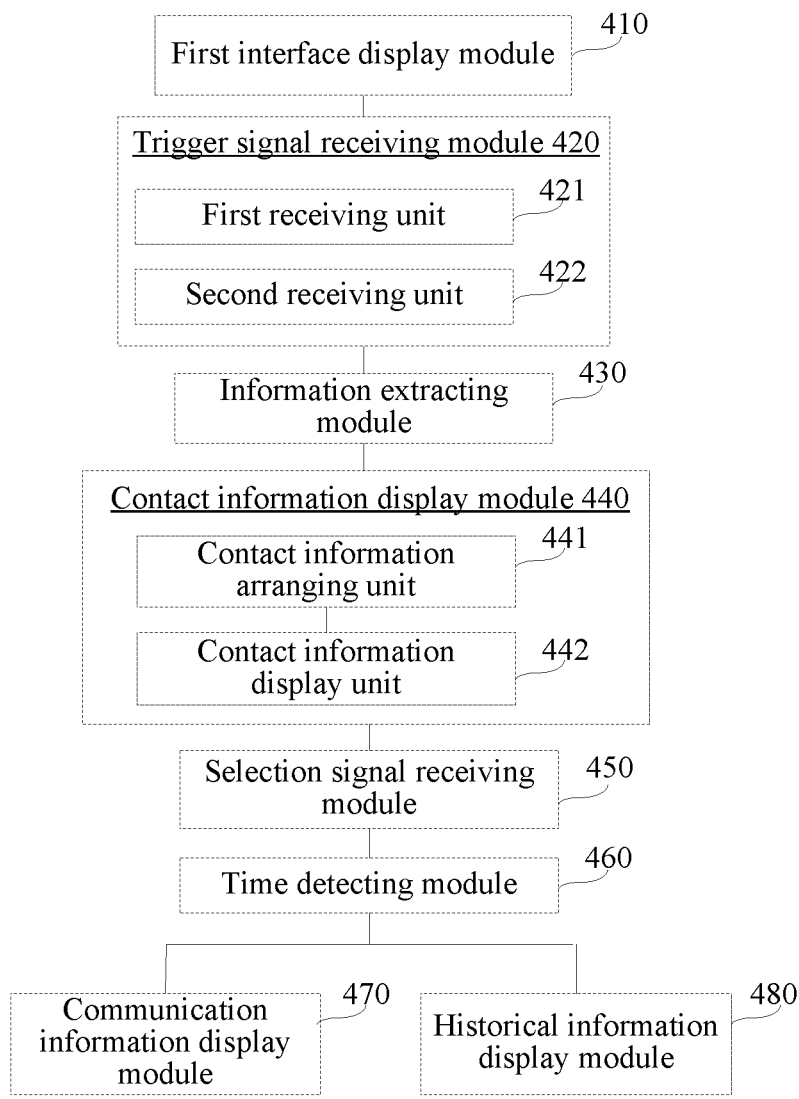
FIG. 4A is a structural block diagram of an information display apparatus according to another embodiment of the present invention.

FIG. 4A shows a structural block diagram of an information display apparatus according to an embodiment of the present invention. The information display apparatus may be implemented by using software, hardware, or a combination of the two, to become all or a part of a terminal. The information display apparatus may include: a first interface display module 410, a trigger signal receiving module 420, an information extracting module 430, and a contact information display module 440, where the first interface display module 410 is configured to display a list interface;

the trigger signal receiving module 420 is configured to receive a trigger signal for changing a display state of the list interface;

the information extracting module 430 is configured to extract contact information from each piece of information in the list interface displayed by the interface display module 410; and the contact information display module 440 is configured to display, in an aggregated state, the contact information extracted by the information extracting module 430.

In a first possible implementation manner of this embodiment, the contact information display module 440 is further configured to display the contact information in a display array with i rows and j columns, where i and j are both integers, and j is greater than or equal to 2.

In a second possible implementation manner of this embodiment, the contact information display module 440 includes:

a contact information arranging unit 441, configured to arrange the contact information in a predetermine order; and a contact information display unit 442, configured to display the arranged contact information in the display array with i rows and j columns, where the predetermine order includes at least one of the following orders:

an order of frequencies of interaction with a current terminal by communication peer ends corresponding to the contact information;

an order of communication time of the last communication with the current terminal by the communication peer ends corresponding to the contact information; and an order of priority levels of groups in which the communication peer ends corresponding to the contact information are located.

In a third possible implementation manner of this embodiment, the apparatus further includes:

a selection signal receiving module 450, configured to receive a selection signal directed at target contact information;

a time detecting module 460, configured to detect whether duration of the selection signal reaches a time threshold; and a communication information display module 470, configured to: if a detection result of the time detecting module 460 is that the duration reaches the time threshold, display information about the last communication at a predetermined position of the target contact information, where the predetermined position includes any one of above, below, left, right, upper left corner, upper right corner, lower left corner, and lower right corner.

In a fourth possible implementation manner of this embodiment, the apparatus further includes:

a historical information display module 480, configured to: if a detection result of the time detecting module is that the duration does not reach the time threshold, display information about historical communication between a current terminal and a communication peer end corresponding to the target contact information.

In a fifth possible implementation manner of this embodiment, the trigger signal receiving module 420 includes:

a first receiving unit 421 or a second receiving unit 422, where the first receiving unit 421 is configured to receive a pinching operation of user fingers; and the second receiving unit 422 is configured to receive a selection signal for a predetermined option in selection and setting options.

Figure 4B:
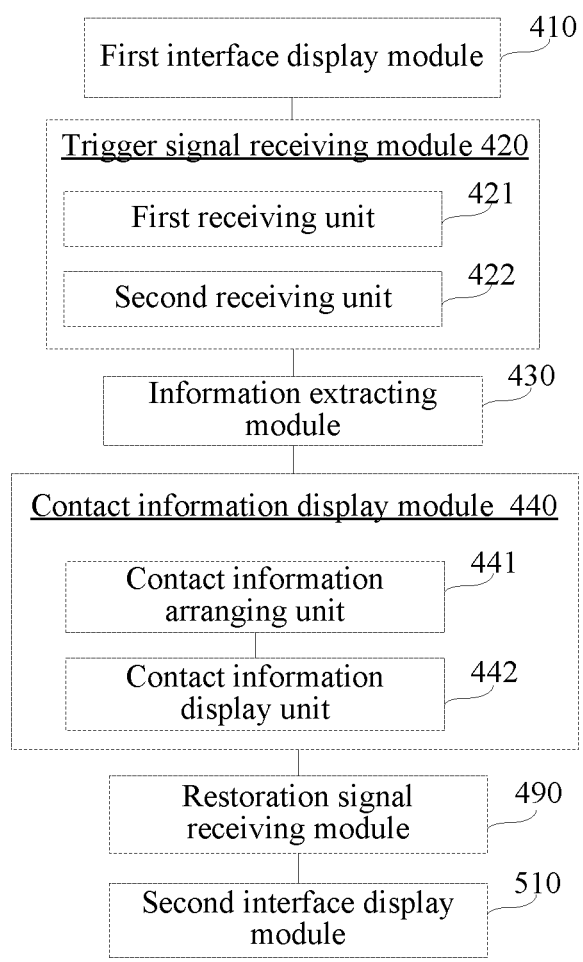
FIG. 4B is another structural block diagram of an information display apparatus according to another embodiment of the present invention.

Referring to FIG. 4B, in a sixth possible implementation manner of this embodiment, the apparatus further includes:

a restoration signal receiving module 490, configured to receive a restoration signal for restoring the display state to a list display state; and a second interface display module 510, configured to display the list interface again.

To sum up, with the information display apparatus provided in this embodiment, when a list interface is displayed, a trigger signal for changing a display state of the list interface is received, contact information is extracted from each piece of information in the list interface, and then the extracted contact information is displayed in an aggregated state, so that the number of pieces of contact information that can be displayed in a terminal interface is greater than the number of pieces of contact information that can be displayed in the list interface, and a user can conveniently search the terminal interface for required contact information, and further find required information. A problem of low information search efficiency in the existing technology is solved, and an effect of improving the information search efficiency is achieved; in addition, because the number of pieces of contact information that can be displayed in the terminal interface is greater than the number of pieces of contact information that can be displayed in the list interface, during information search, the user can find required information by sliding a fewer number of times or even without performing a slide operation, solving a problem in the existing technology that the service life of a touch screen and battery of a terminal is shortened.

Figure 5:
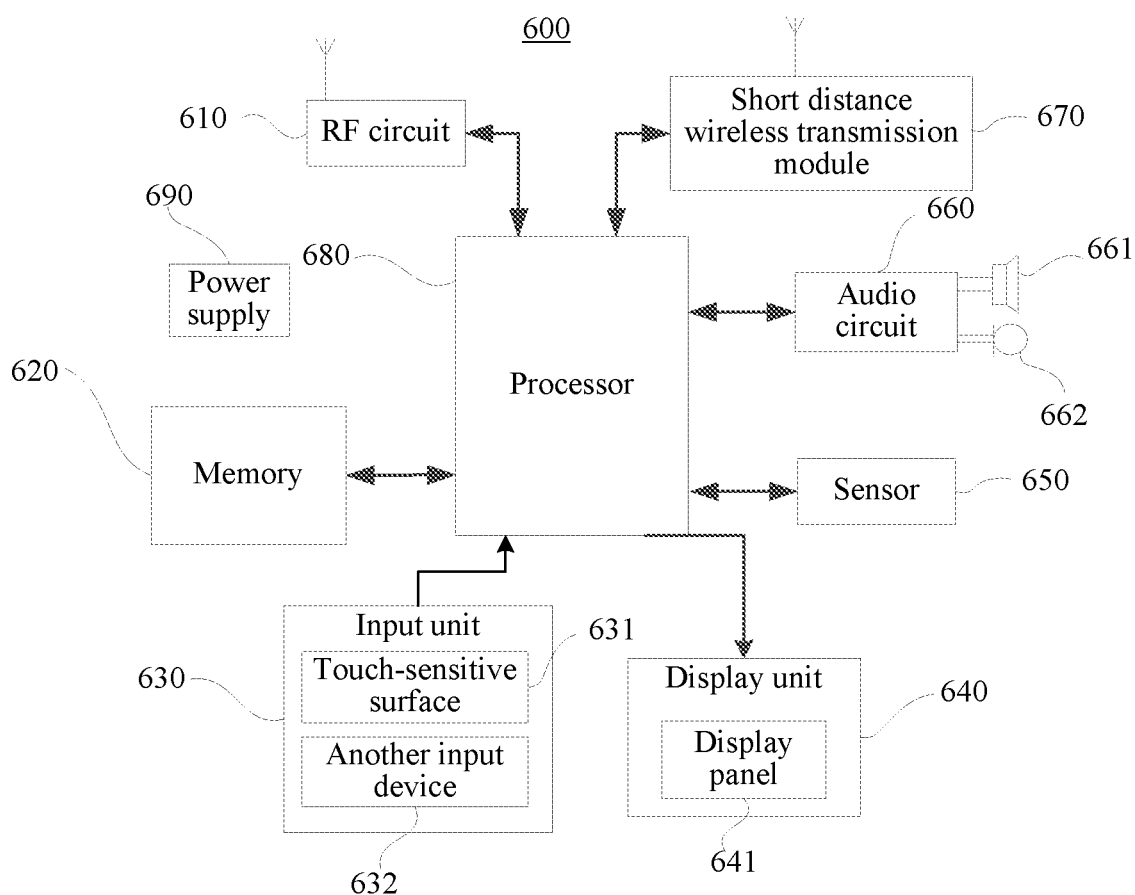
FIG. 5 is a structural block diagram of a terminal according to an embodiment of the present invention.

FIG. 5 shows a schematic structural diagram of a terminal according to an embodiment of the present invention. The terminal is configured to implement the information display method provided in the foregoing embodiments. Specifically:

The terminal 600 may include components, such as a radio frequency (RF) circuit 610, a memory 620 including one or more computer readable storage media, an input unit 630, a display unit 640, a sensor 650, an audio circuit 660, a short distance wireless transmission module 670, a processor 680 including one or more processing cores, and a power supply 690. Persons skilled in the art may understand that, the terminal is not limited to the terminal structure shown in FIG. 5 and may include more or less components than those shown in the figure, or a combination of some components, or different component layouts.

The RF circuit 610 may be configured to receive and send information or receive or send signals during an information receiving and sending process or a call process, and particularly receives downlink information from a base station, then delivers the downlink information to one or more processors 680 for processing, and sends related uplink data to the base station. Generally, the RF circuit 610 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 610 may further communicate with a network and other devices by means of wireless communication. The wireless communication may use any communications standard or protocol, including but not limited to Global System for Mobile communications (GSM), General Packet Radio Service (GPRS), Code Division Multiple Access (CDMA), Wideband Code Division Multiple Access (WCDMA), Long Term Evolution (LTE), e-mail, Short Message Service (SMS), and the like.

The memory 620 may be configured to store a software program and module. The processor 680 runs the software program and module stored in the memory 620, to implement various functional applications and data processing. The memory 620 may mainly include a program storage area and a data storage area. The program storage area may store an operating system, an application program required by at least one function (such as a sound playback function and an image display function), and the like. The data storage area may store data (such as audio data and an address book) created according to use of the terminal 600, and the like. In addition, the memory 620 may include a high speed random access memory, and may also include a non-volatile memory, such as at least one magnetic disk storage device, a flash memory, or another volatile solid-state storage device. Correspondingly, the memory 620 may further include a memory controller, so as to provide access of the processor 680 and the input unit 630 to the memory 620.

The input unit 630 may be configured to receive input digit or character information, and generate a keyboard, mouse, joystick, optical, or track ball signal input related to the user setting and function control. Specifically, the input unit 630 may include a touch-sensitive surface 631 and another input device 632. The touch-sensitive surface 631, which may also be referred to as a touch screen or a touch panel, may collect a touch operation of a user on or near the touch-sensitive surface (such as an operation of a user on or near the touch-sensitive surface 631 by using any suitable object or accessory, such as a finger or a stylus), and drive a corresponding connection apparatus according to a preset program. Optionally, the touch-sensitive surface 631 may include two parts: a touch detection apparatus and a touch controller. The touch detection apparatus detects a touch position of the user, detects a signal generated by the touch operation, and transfers the signal to the touch controller. The touch controller receives the touch signal from the touch detection apparatus, converts the touch signal into touch point coordinates, and sends the touch point coordinates to the processor 680. Moreover, the touch controller can receive and execute a command sent from the processor 180. In addition, the touch-sensitive surface 631 may be may be a resistive, capacitive, infrared, or surface sound wave type touch-sensitive surface. In addition to the touch-sensitive surface 631, the input unit 630 may further include the another input device 632. Specifically, the another input device 632 may include, but is not limited to, one or more of a physical keyboard, a functional key (such as a volume control key or a switch key), a track ball, a mouse, and a joystick.

The display unit 640 may be configured to display information input by the user or information provided for the user, and various graphical user interfaces of the terminal 600. The graphical user interfaces may be formed by a graph, a text, an icon, a video, or any combination thereof. The display unit 640 may include a display panel 641. Optionally, the display panel 641 may be configured by using a liquid crystal display (LCD), an organic light-emitting diode (OLED), or the like. Further, the touch-sensitive surface 631 may cover the display panel 641. After detecting a touch operation on or near the touch-sensitive surface 631, the touch-sensitive surface 131 transfers the touch operation to the processor 680, so as to determine the type of the touch event. Then, the processor 680 provides a corresponding visual output on the display panel 641 according to the type of the touch event. Although in FIG. 5, the touch-sensitive surface 631 and the display panel 641 are used as two separate parts to implement input and output functions, in some embodiments, the touch-sensitive surface 631 and the display panel 641 may be integrated to implement the input and output functions.

The terminal 600 may further include at least one sensor 650, such as a light sensor, a motion sensor, and other sensors. Specifically, the light sensor may include an ambient light sensor and a proximity sensor, where the ambient light sensor may adjust luminance of the display panel 641 according to brightness of ambient light, and the proximity sensor may turn off the display panel 641 and/or backlight when the terminal 600 moves to the ear. As one of the motion sensor, the gravity acceleration sensor may detect a size of acceleration in various directions (generally, in a triaxial direction), may detect a size and a direction of gravity when the gravity acceleration sensor is in a static condition, and may be used to identify an application of a phone attitude (such as switchover between a horizontal screen and a vertical screen, a relevant game, magnetometer attitude calibration), and identify relevant functions in a vibration condition (such as a pedometer and knocking); the terminal 600 may further be configured with other sensors, such as a gyroscope, a barometer, a hygrometer, a thermometer and an infrared sensor, and details are not described herein again.

The audio circuit 660, a loudspeaker 661, and a microphone 662 may provide audio interfaces between a user and the terminal 600. The audio circuit 660 may transmit an electrical signal, which is converted from received audio data, to the loudspeaker 661. The loudspeaker 661 converts the electrical signal into a sound signal and outputs the sound signal. On the other side, the microphone 662 converts a collected sound signal into an electrical signal. After receiving the electrical signal, the audio circuit 660 converts the electrical signal into audio data, and then outputs the audio data. After being processed by the processor 680, the audio data is sent through the RF circuit 610 to, for example, another terminal or the audio data is output to the memory 620 for further processing. The audio circuit 660 may further include an earplug jack, so as to provide communication between a peripheral earphone and the terminal 600.

The short distance wireless transmission module 670 may be a Wireless Fidelity (WIFI) module, a Bluetooth module, or the like. The terminal 600 may help, by using the short distance wireless transmission module 670, the user to receive and send e-mails, browse a webpage, access streaming media, and so on, which provides wireless broadband Internet access for the user. Although the short distance wireless transmission module 670 is shown in FIG. 5, it may be understood that the short distance wireless transmission module 670 is not a requisite part of the terminal 600 and may be omitted as required as long as the essence of the present disclosure is not changed.

The processor 680 is the control center of the terminal, and is connected to various parts of the terminal by using various interfaces and lines. By running or executing the software program and/or module stored in the memory 620, and invoking data stored in the memory 620, the processor 680 performs various functions and data processing of the terminal 600, thereby performing overall monitoring on the terminal. Optionally, the processor 680 may include one or more processor cores. Preferably, the processor 680 may integrate an application processor and a modem. The application processor mainly processes an operating system, a user interface, an application program, and the like. The modem mainly processes wireless communication. It may be understood that, the foregoing modem may also not be integrated into the processor 680.

The terminal 600 further includes the power supply 690 (such as a battery) supplying power to the components. Preferably, the power supply may be logically connected to the processor 680 by using a power management system, so as to implement functions such as charging, discharging, and power consumption management by using the power management system. The power supply 690 may further include one or more of a direct current or alternating current power supply, a re-charging system, a power failure detection circuit, a power supply converter or inverter, a power supply state indicator, and any other components.

Although not shown in the figure, the terminal 600 may further include a camera, a Bluetooth module, and the like, which are not further described herein. Specifically, in this embodiment, the display unit of the terminal 600 is a touch screen display.

The terminal 600 further includes a memory and one or more programs. The one or more programs are stored in the memory and configured to be executed by one or more processors. The one or more programs include instructions for implementing an information display method, where the information display method is the information display method shown in the foregoing method embodiments.

As another aspect, still another embodiment of the present invention provides a computer readable storage medium, where the computer readable storage medium may be a computer readable storage medium included in the memory in the foregoing embodiment; or may exist alone, and is not assembled to a computer readable storage medium of a terminal or a server. The computer readable storage medium stores one or more programs, the one or more programs are executed by one or more processors to execute an information display method, and the one or more programs include instructions for executing an information display method, where the information display method is the information display method shown in the foregoing methods.

It should be noted that, when the information display apparatus provided in the foregoing embodiment implements information display, the foregoing division of the functional modules is merely an example for description. In practical application, the foregoing functions may be allocated to and completed by different functional modules as required, that is, an inner structure of a device is divided into different functional modules, so as to complete all or some of the functions described above. In addition, the information display apparatus and the information display method provided in the foregoing embodiments are based on the same conception. For a specific implementation process of the information display apparatus, reference is made to the method embodiments, and details are not described herein again.

The sequence numbers of the embodiments of the present invention are merely for the convenience of description, and do not imply the preference among the embodiments.

A person of ordinary skill in the art may understand that, all or some of the steps of the foregoing embodiments may be implemented through hardware, or may be implemented by a program instructing relevant hardware. The program may be stored in a computer readable storage medium. The storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. An information display method, comprising:
   displaying, in a display, a list interface in a list display state including a first set of entries of list information, the list interface in the list display state displayed in a single column, and wherein each entry of list information of the first set of entries uniquely corresponds to a respective one of a first set of communication peer ends and includes contact information of a communication peer end of the first set to which the entry uniquely corresponds, communication content of a last communication with the communication peer end, and a communication time of the last communication with the communication peer end;
   receiving a trigger signal for changing a display state of the list interface from the list display state to an aggregated state of displaying contact information;
   in response to the trigger signal, extracting contact information from each entry in the list interface displayed in the list display state; and
   changing the display state of the list interface from the list display state to the aggregated state by:
      removing, from the display, the communication content and the communication time of the last communication from each entry of the first set of entries displayed in the list display state;
      adding a second set of entries of list information to the list interface, wherein each entry of the second set of entries uniquely corresponds to a respective one of a second set of communication peer ends; and
      displaying the extracted contact information of the first set of entries and contact information of the second set of entries in a two-dimensional array with i rows and j columns, wherein i and j are both integers greater than or equal to 2, and wherein at least two entries of the first set of entries are in different columns of the i columns.

2. The method according to claim 1,
   wherein the list interface is displayed in the aggregated state in a predetermined order comprising one of the following orders:
   an order of frequencies of interaction with a current terminal by communication peer ends corresponding to the contact information;
   an order of communication time of the last communication with the current terminal by the communication peer ends corresponding to the contact information; and
   an order of priority levels of groups in which the communication peer ends corresponding to the contact information are located.

3. The method according to claim 1, wherein after the displaying the extracted contact information in the aggregated state, the method further comprises:
   receiving a selection signal directed at target contact information;
   detecting whether duration of the selection signal reaches a time threshold; and
   displaying information about the last communication at a predetermined position of the target contact information when the duration reaches the time threshold, wherein the predetermined position comprises any one of above, below, left, right, upper left corner, upper right corner, lower left corner, and lower right corner.

4. The method according to claim 3, further comprising: displaying information about historical communication between a current terminal and a communication peer end corresponding to the target contact information when the duration does not reach the time threshold.

5. The method according to claim 1, wherein the receiving a trigger signal for changing a display state of the list interface comprises:
receiving a pinching operation of user fingers;
or
receiving a selection signal for a predetermined option in selection and setting options.

6. The method according to claim 1, wherein after the displaying the extracted contact information in the aggregated state, the method further comprises:
receiving a restoration signal for restoring the display state to the list display state; and
displaying the list interface in the list display state again.

7. An information display apparatus, comprising:
a memory storing instructions; and
a processor configured to execute the instructions stored in a memory to:
display, in a display, a list interface in a list display state including a first set of entries of list information, the list interface in the list display state displayed in a single column, and wherein each entry of list information of the first set of entries uniquely corresponds to a respective one of a first set of communication peer ends and includes contact information of a communication peer end of the first set to which the entry uniquely corresponds, communication content of a last communication with the communication peer end, and a communication time of the last communication with the communication peer end;
receive a trigger signal for changing a display state of the list interface from the list display state to an aggregated state of displaying contact information;
in response to the trigger signal, extract contact information from each entry in the list interface displayed in the first display state; and
in order to change the display state of the list interface from the list display state to the aggregated state:
remove, from the display, the communication content and the communication time of the last communication from each entry of the first set of entries displayed in the list display state;
add a second set of entries of list information to the list interface, wherein each entry of the second set of entries uniquely corresponds to a respective one of a second set of communication peer ends; and
display the extracted contact information of the first set of entries and contact information of the second set of entries in a two-dimensional array with i rows and j columns, wherein i and j are both integers greater than or equal to 2, and wherein at least two entries of the first set of entries are in different columns of the i columns.

8. The apparatus according to claim 7, wherein the list interface is displayed in the aggregated state in a predetermined order comprising one of the following orders:
an order of frequencies of interaction with a current terminal by communication peer ends corresponding to the contact information;
an order of communication time of the last communication with the current terminal by the communication peer ends corresponding to the contact information; and
an order of priority levels of groups in which the communication peer ends corresponding to the contact information are located.

9. The apparatus according to claim 7, wherein the processor is further configured to execute the instructions to:
receive a selection signal directed at target contact information;
detect whether duration of the selection signal reaches a time threshold; and
when a detection result of the time detecting instruction is that the duration reaches the time threshold, display information about the last communication at a predetermined position of the target contact information, wherein
the predetermined position comprises any one of above, below, left, right, upper left corner, upper right corner, lower left corner, and lower right corner.

10. The apparatus according to claim 9, wherein the processor is further configured to execute the instructions to:
when a detection result of the time detecting instruction is that the duration does not reach the time threshold, display information about historical communication between a current terminal and a communication peer end corresponding to the target contact information.

11. The apparatus according to claim 7, wherein the processor is configured to receive the trigger by:
receiving a pinching operation of user fingers; or
receiving a selection signal for a predetermined option in selection and setting options.

12. The apparatus according to claim 7, wherein the processor is further configured to execute the instructions to:
receive a restoration signal for restoring the display state to the list display state; and
display the list interface in the list display state again.

13. A non-transitory computer readable storage medium storing a computer program, the computer program comprising instructions to execute the following procedure:
display, in a display, a list interface in a list display state including a first set of entries of list information, the list interface in the list display state displayed in a single column, and wherein each entry of list information of the first set of entries uniquely corresponds to a respective one of a first set of communication peer ends and includes contact information of a communication peer end of the first set to which the entry uniquely corresponds, communication content of a last communication with the communication peer end, and a communication time of the last communication with the communication peer end;
receive a trigger signal for changing a display state of the list interface from the list display state to an aggregated state of displaying contact information;
in response to the trigger signal, extract contact information from each entry in the list interface displayed in the list display state; and
in order to change the display state of the list interface from the list display state to the aggregated state:
remove, from the display, the communication content and the communication time of the last communication from each entry of the first set of entries displayed in the list display state;
add a second set of entries of list information to the list interface, wherein each entry of the second set of entries uniquely corresponds to a respective one of a second set of communication peer ends; and display the extracted contact information of the first set of entries and contact information of the second set of entries in a two-dimensional array with i rows and j columns, wherein i and j are both integers greater than or equal to 2, and wherein at least two entries of the first set of entries are in different columns of the j columns.

14. The non-transitory computer readable storage medium according to claim 13, wherein the computer program further comprises instructions to execute the following procedure:

receive a selection signal directed at target contact information;

detect whether duration of the selection signal reaches a time threshold; and when a detection result is that the duration reaches the time threshold, display information about the last communication at a predetermined position of the target contact information, wherein the predetermined position comprises any one of above, below, left, right, upper left corner, upper right corner, lower left corner, and lower right corner.

15. The non-transitory computer readable storage medium according to claim 14, wherein the computer program further comprising instructions to execute the following procedure:

when a detection result is that the duration does not reach the time threshold, display information about historical communication between a current terminal and a communication peer end corresponding to the target contact information.

16. The non-transitory computer readable storage medium according to claim 13, wherein the computer program further comprises instructions to execute the following procedure:

receive a pinching operation of user fingers; and receive a selection signal for a predetermined option in selection and setting options.

17. The non-transitory computer readable storage medium according to claim 13, wherein the computer program further comprises instructions to execute the following procedure:

receive a restoration signal for restoring the display state to the list display state; and display the list interface in the list display state again.

* * * * *